July 29, 1958
A. A. FURCZYK
2,845,261
METAL MELTING FURNACE
Filed Nov. 16, 1954
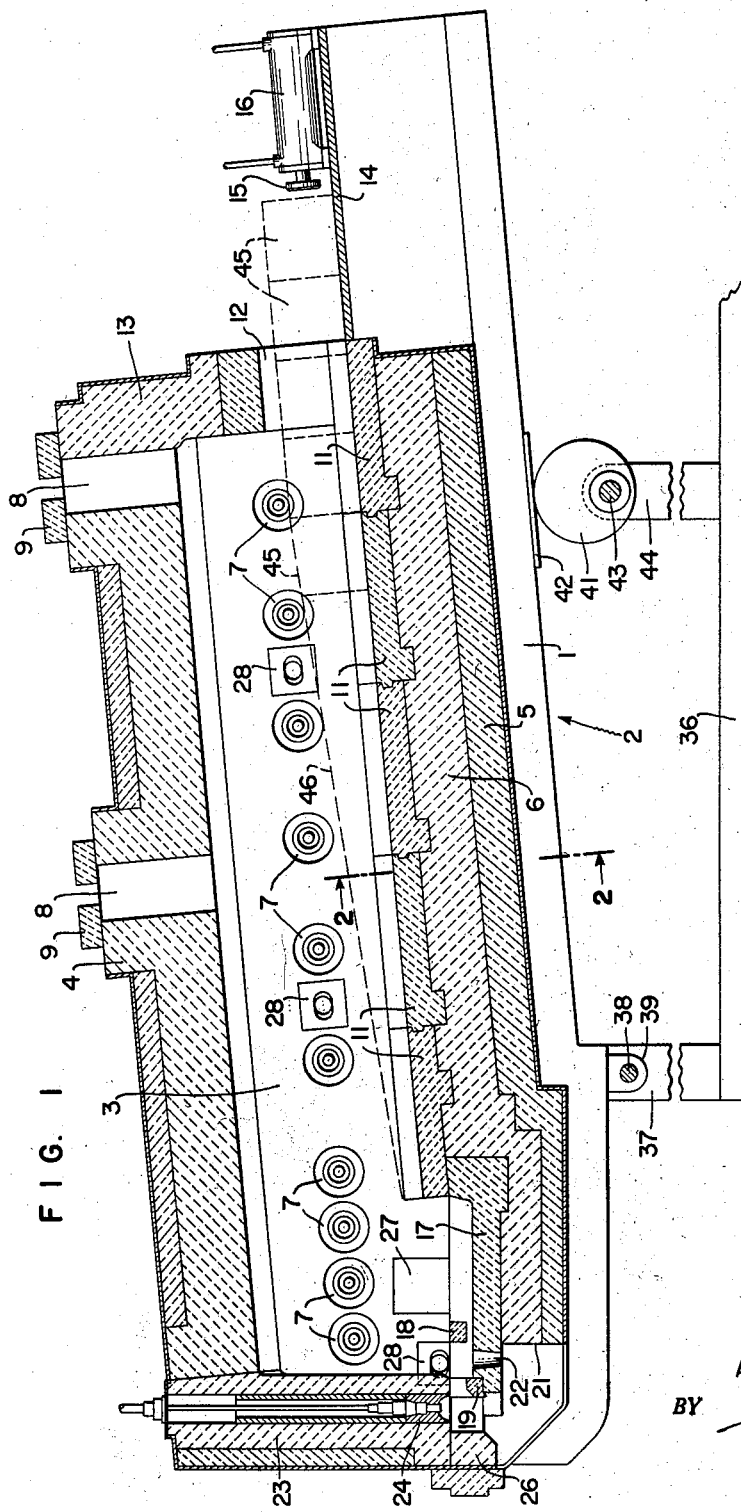
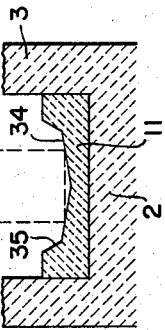
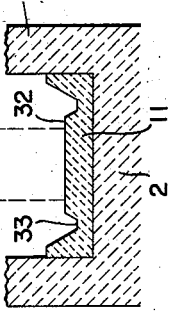
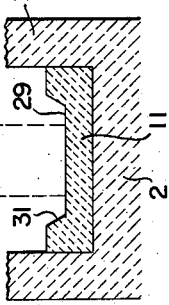
*INVENTOR.*
ALFONS A. FURCZYK
BY
ATTORNEY.

United States Patent Office 2,845,261
Patented July 29, 1958

2,845,261

METAL MELTING FURNACE

Alfons Alfred Furczyk, Wyncote, Pa., assignor to Selas Corporation of America, Philadelphia, Pa., a corporation of Pennsylvania Application November 16, 1954, Serial No. 469,103

4 Claims. (Cl. 266—33)

The present invention relates to furnaces and more particularly to furnaces that may be used for the continual melting of metals.

At the present time, it is usual in the melting of metals to place a quantity of metal to be melted in a crucible or melting pot, and melt it. When the metal is liquid, it is ladled or poured off, and the process is repeated. This batch technique is costly and time consuming as well as requiring a large amount of handling apparatus. In addition, a great deal of heat is required to keep the large bodies of metal liquid until they are used.

In accordance with the present invention, there is provided a furnace having an elongated hearth along which metal is melted progressively as it is moved from the charge to the discharge end of the furnace. The hearth is sloping so that the melted metal can run to a pan of small capacity, from which it is discharged directly and continuously to casting or other apparatus. Thus, solid metal is supplied continuously at one end of the furnace and removed as a liquid from the other at a rate dependent upon the capacity of the furnace. There is no reservoir for the liquid metal to be accumulated, therefore, no additional heat is needed to keep the metal liquid until used.

It is an object of the present invention to provide a continuous metal melting furnace. It is a further object of the invention to provide a furnace in which metal is continuously introduced in solid form in one end and is continuously withdrawn in liquid form at the other end. It is another object of the invention to provide a metal melting furnace that has a sloping floor or hearth down which the metal flows as it is melted into a small collecting pan from which it is discharged.

A further object of the invention is to provide means for supporting a furnace of the type in question for tilting movement to thereby start and stop the flow of melted metal from the furnace.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a sectional view through the furnace showing the construction thereof and the feeding mechanism;

Figure 2 is a view taken on line 2—2 of Figure 1 showing the shape of the hearth; and Figures 3 and 4 are sections similar to Figure 2 showing hearths of a different shape.

The furnace is built upon a rigid structural steel framework 1, and includes a floor 2, side walls 3 and roof 4. The furnace walls are built in accordance with ordinary furnace construction practices. As shown herein, the walls, floor and roof include a layer of insulating material 5 and a layer of refractory material 6. The walls are provided with a plurality of burners 7 by means of which the furnace is heated, and the roof is provided with a pair of vents 8 through which the products of combustion are discharged. Any suitable means, such as the bricks 9, can be used to vary the openings of the vents to control the furnace pressure. The burners may be of any desirable type but are shown herein as being of the radiant cup type such as is disclosed in Hess Patent 2,215,079 issued September 20, 1940.

The floor is covered with a hearth consisting of dense abrasion and heat resistant tiles 11 upon which the metal to be melted is placed and along which it is moved as the melting takes place.

The furnace is shown in the drawings in its normal position. It will be noted that the hearth is at an angle of approximately 15° to the horizontal. The upper or loading end of the hearth extends through a charge opening 12 formed in an end wall 13 of the furnace. Feeding mechanism for supplying the metal to be heated is also mounted on the frame 1 to the right of end wall 13. As shown herein, the feeding mechanism includes a loading platform 14 upon which the metal is placed, preferably in the form of briquettes 45. The briquettes are moved one after the other in a continual line, as shown, by means of a plunger 15 extending from a hydraulic cylinder 16, for example. The cylinder is operated to move the plunger to the left and shift the briquettes in that direction. The plunger is periodically moved to the right to make place for an additional briquette, so that the supply of briquettes to the furnace is, in effect, continuous.

Beyond the left end of the hearth and below the same is a horizontally positioned collecting pan 17 in which metal melted on the hearth is collected. This pan is provided with a skimming rod 18, and on the left end thereof with weir 19 over which the metal runs. As the metal flows over the weir, it moves vertically downward to some apparatus, such as an automatic casting apparatus, for example, in which the metal is used. It will be noted that the floor, as such, terminates at a point 21 to the right of the end of the collecting pan. Immediately adjacent to the edge 21, the pan is provided with drain plug 22 that can be removed to drain the collecting pan. It will also be noted that the collecting pan is very shallow, so that it will hold only a small amount of metal.

The left end 23 of the furnace extends downwardly to a point adjacent to the top of weir 19, so that the pan itself is within the furnace chamber. This end wall of the furnace is provided with a burner shown at 24 that is directed downwardly, so that the heat of the burner will keep the metal molten as it is flowing over the weir. The lower portion of the end wall 23 is provided with a removable block 26 which, when removed, will give access to the weir for cleaning purposes. Each of the side walls of the furnace is also provided with a removable block 27 adjacent to the collecting pan, through which this pan can be cleaned from time to time when it is necessary or desirable. Also located in the side walls of the furnace are a number of peep openings 28 through which the melting progress can be observed. These openings are, of course, provided with normally closed covers that can be removed when observation of the furnace is necessary.

As shown in Figure 2 of the drawing, the hearth tiles 11 are provided with a floor portion 29 upon which the briquettes rest and curb portions 31 to form, in effect, a channel down which the briquettes are moved and in which liquid metal is collected to drain into pan 17. The hearth tiles 11 may take other shapes than that shown in Figure 2, if desired. For example, in Figure 3, the tile 11 is shown as being formed with a platform 32 and side channels or gutters 33 in which the liquid can collect as it is draining toward pan 17. The tile 11 shown in Figure 4 is formed with a floor 34 that is substantially V-shaped and with curbs 35 at the edges thereof. Regardless of the shape of the tiles, however, it will be seen that the briquettes are moved along the hearth during the melting process, and that the molten metal will drain down the hearth to the collecting pan.

The entire furnace is mounted for tilting movement around an axis perpendicular to the length of the hearth. To this end, there is provided a frame 36 which has a pair of vertical members 37 that support a shaft 38. Lugs 39 extending downwardly from the frame 1 are received by the shaft to act as a hinge around which the furnace may be tilted. The furnace is normally kept in the position shown in the drawing by means of engagement between a cam 41 and a wear plate 42 on the bottom of the frame. This cam is attached to a shaft 43 which, in turn, is journaled in an upright support 44. Rotation of the cam 41 will vary the angular position of the furnace around its pivots 39.

In the operation of the furnace, metal to be melted, preferably in the form of briquettes 45, is moved in a continuous stream one after the other through the entrance opening 12 of the furnace, and toward the left in Figure 1. As one briquette is moved into the furnace, the loading mechanism will be retracted so that another can be moved into position, whereby there is a continuous supply of metal at all times. Normally, the metal will gradually be melted, so that the briquettes are gradually reduced in size as they move to the left. The rate of movement of the briquettes taken in connection with the length of the furnace and its temperature is such that by the time they reach the left end of the hearth, they will be completely melted. The gradient of melting is indicated diagrammatically in Figure 1 by the line 46. As the metal is collecting continuously in pan 17, it flows over the weir 19 to the point of use. Thus, the metal is continuously melted and continuously discharged without the use of a reservoir as such in which a supply of metal is retained. If for some reason the melting process is to be discontinued, it is only necessary to cut down the supply of fuel to the burners and rotate the cam 41 to tilt the furnace clockwise in Figure 1 of the drawing. Such action will raise the weir 19 to cut off the flow of metal.

Furnaces of the type shown herein are particularly useful in the melting of non-ferrous metals such as, for example, copper and aluminum. Scrap copper, for example, is ordinarily received in briquettes that are 8" square and 16" long, weighing approximately 60 pounds. If the hearth is approximately 7½' long and the temperature of the furnace is 2400° F., briquettes of this type in copper can be melted continuously at the rate of 400 pounds per hour.

The construction of the furnace herein utilizes all of the heat to advantage in that the addition of fresh metal to be melted does not have the effect of chilling the metal that has already been melted or of chilling the holding end of the furnace. Furthermore, because of the fact that there is no supply of molten metal beyond that which is being melted continuously in the furnace, the furnace can be placed into operation and removed from operation quickly with a minimum of labor.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. In a metal melting furnace, the combination of structure forming a furnace including an elongated chamber having side walls, roof and hearth, said chamber being provided with a charge opening in one end thereof, a loading platform extending beyond said opening as a continuation of said hearth, means adjacent to said opening to supply bodies of metal one after the other to said platform and hearth to be moved therealong, a row of radiant cup type burners located in and forming a portion of the walls of said chamber substantially throughout the length of and along said hearth and focused on the bodies of metal to melt the bodies of metal progressively as they are moving along said hearth, a collecting pan for melted metal at the one end of said hearth remote from said charge opening and at an angle thereto, one wall of said pan comprising an outlet including a weir over which metal can continuously flow from said pan, mechanism to support said furnace structure for tilting movement around an axis perpendicular to its length, and means to adjust said mechanism to tilt said structure from a normal position in which said hearth is at an angle to the horizontal and said pan is horizontal to a position in which said pan is at an angle to the horizontal with said weir raised above the metal level and said hearth is substantially horizontal.

2. A furnace including structure forming an elongated furnace chamber having a roof, side walls, and a hearth, said hearth being at an angle to the horizontal lengthwise thereof, platform means located beyond the upper end of the hearth and forming a continuation thereof, means to move bodies of metal along said platform means to move down said hearth, a plurality of radiant cup-type burners located in a row in the walls of the chamber and extending substantially throughout the length thereof, said burners being focused on the metal bodies to heat the same and melt the bodies of metal progressively as they are moved along said hearth, and a collecting pan located adjacent to the lower end of said hearth into which the melted metal flows, said pan having an outlet including a weir remote from said hearth controlling the level of metal in said pan and over which metal flows continuously during operation of the furnace.

3. A metal melting furnace including in combination structure forming an elongated furnace chamber including side walls, a roof and a hearth, said hearth being at an angle to the horizontal, the structure being formed with a charge opening adjacent to the upper end of said hearth, a loading platform extending beyond said opening as a continuation of said hearth, means to supply bodies of metal one after the other in a continuous stream to said platform, through said opening and along said hearth, a plurality of radiant cup-type burners located in a row substantially throughout its length in the walls of said furnace chamber and forming a portion of the wall thereof and focused on the metal to melt the bodies of metal progressively as they move along said hearth, the molten metal flowing down said hearth, a shallow, horizontal collecting pan located at the lower end of said hearth to collect the molten metal, said pan being provided with an outlet including a weir opposite said hearth to control the metal level in said hearth and over which metal flows continuously while the furnace is in operation.

4. In a furnace for the continuous melting of metal, an elongated hearth at a slight angle to the horizontal, wall means surrounding said hearth to form an elongated chamber with the hearth as the floor, means forming an opening at the upper end of said chamber, a loading platform aligned with said opening and forming a continuation of said hearth beyond said chamber upon which metal to be melted is placed for movement along said hearth, a row of radiant cup-type burners in and forming a part of the walls of said chamber for substantially the length thereof, said burner being focused on metal on said hearth to melt progressively the metal as it moves down said hearth, means located below and joined to said hearth forming a collecting pan into which molten metal flows from said hearth, said wall means extending over said pan to include the same in said chamber, and means including a weir forming an outlet from said pan through which metal is adapted to flow continuously while the furnace is in operation, said weir serving to maintain metal in said pan at a predetermined level.

References Cited in the file of this patent

UNITED STATES PATENTS

| | | |
|---|---|---|
| 924,025 | Wilshire | June 8, 1909 |
| 1,092,938 | Mellen | Apr. 14, 1914 |
| 1,476,106 | Rocklity | Dec. 4, 1923 |
| 1,692,614 | Bissell | Nov. 20, 1928 |
| 1,895,726 | Offut | Jan. 31, 1933 |
| 1,965,928 | McGregor | July 10, 1934 |
| 2,089,742 | Garwin | Aug. 10, 1937 |

FOREIGN PATENTS

| | | |
|---|---|---|
| 383,103 | Great Britain | Nov. 10, 1932 |
| 444,535 | Germany | May 24, 1927 |
| 670,110 | Germany | Jan. 12, 1939 |